LESTER NIRENBERG

United States Patent Office 3,418,215
Patented Dec. 24, 1968

3,418,215
DISTILLATION OF PROPYLENE DIMERIZATION REACTION EFFLUENT USING COMPRESSED PROPYLENE AS STRIPPING VAPOR
Lester Nirenberg, Brooklyn, N.Y., assignor to Halcon International, Inc., a corporation of Delaware
Continuation-in-part of applications Ser. No. 125,886, May 3, 1961, and Ser. No. 481,995, June 16, 1965. This application Aug. 18, 1966, Ser. No. 573,222
3 Claims. (Cl. 203—49)

ABSTRACT OF THE DISCLOSURE

This invention relates to a process for the recovery of trialkyl aluminum catalysts from a propylene dimerization reaction effluent and, more particularly, this invention relates to such a process wherein the catalyst is recovered substantially free of propylene trimer and in a high activity form. This is accomplished by stripping propylene trimer from the catalyst with vaporized propylene under specific conditions.

Cross references

Figure 1:
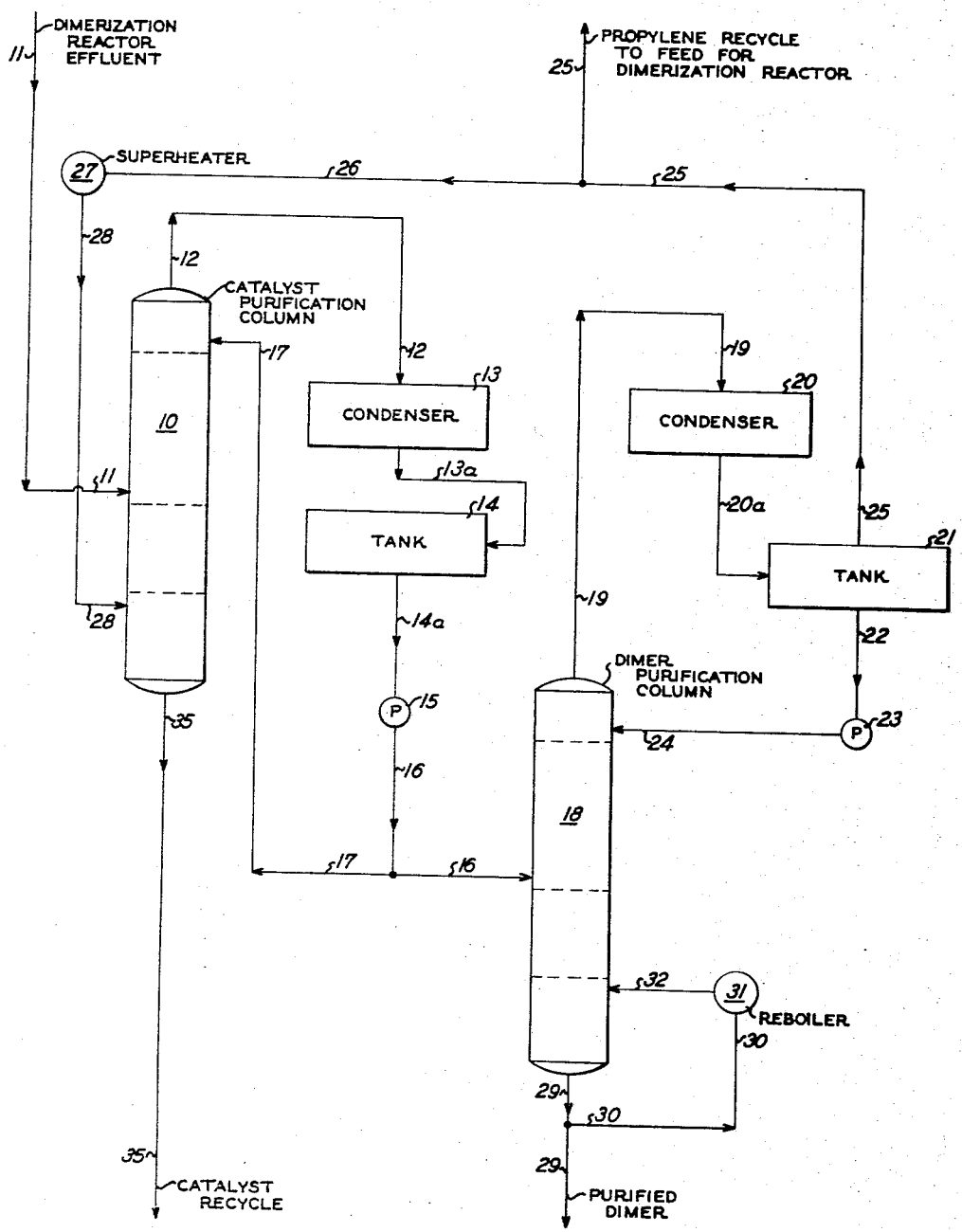

This application is a continuation in part of application Ser. No. 481,995, filed June 16, 1965, and application Ser. No. 125,886, filed May 3, 1961, now abandoned.

The liquid phase dimerization of propylene with aluminum trialkyl catalyst is a commercially valuable process for the preparation of branched chain hexenes. Branched chain hexenes may be cracked to make isoprene. It is important to process economics to recycle the aluminum trialkyl catalyst after separation of dimer from the reaction mixture.

Propylene trimer, nonene, is also formed in the reaction and if present in the recycled catalyst in substantial amounts, the life of the catalyst is shortened and the yield of dimer is markedly reduced. The most active form of the catalyst is aluminum tripropyl. When nonenes are allowed to build up in the catalyst the aluminum tripropyl undergoes trans-alkylation to aluminum tri-nonyl and is thusly rendered inactive.

The nonenes can be removed from the catalyst by ordinary vacuum distillation techniques but it is undesirable to subject the catalyst to vacuum because in-leaked air causes rapid deactivation. The catalyst, however, decomposes at the elevated temperatures required for the application of normal distillation processes. The art is therefore confronted with the problem of providing an atmospheric or superatmospheric process whereby the catalyst can be recycled relatively free of the nonenes.

Catalyst as used herein refers to the aluminum trialkyl compounds. During a continuous operation, however, heavy propylene polymers such as dodecylenes and higher polymers may build up very slowly. These compounds cannot be removed from the aluminum trialkyl compounds except by very costly techniques. They are removed from the system therefore by continuously purging a very small stream of catalyst containing the heavy polymers. To minimize the loss of the expensive catalyst in this purge stream the heavy polymers are allowed to build up to significant proportions with respect to the catalyst. Just how much is allowed to build up depends upon economic considerations.

The material which is recycled to the dimerization reactor by the process of this invention may therefore be a relatively pure aluminum trialkyl mixture, as for example, when the process is starting up, or it may be a mixture of aluminum trialkyl compounds, dodecylenes and higher propylene polymers, as for example, in a process which has run for some time. This stream is commonly called the catalyst liquid and as stated it may contain varying proportions of dodecylenes and higher propylene polymers.

The dimerization reactor effluent contains this catalyst liquid substantially as it was fed to the reactor except for the tiny amount of dodecylene formed. The effluent contains as well, however, along with unreacted propylene and product hexene, a substantial amount of nonenes. It is these nonenes which if not removed from the catalyst liquid prior to its recycle cause the deactivation of the catalyst.

It has been discovered that the nonenes can be removed from the catalyst liquid in an atmospheric or superatmospheric distillation process by stripping the catalyst with a propylene fraction. The propylene stripping medium at once reduces the temperature of the catalyst in the distillation, strips the catalyst of nonenes and retards formation of aluminum tri-nonyl.

The new process in brief compass contains the following process steps. Dimerization reactor effluent containing propylene, hexenes, nonenes and catalyst liquid is fractionated in a first distillation zone to remove all of the propylene, hexenes and most of the nonenes as an overhead product and substantially nonene-free catalyst liquid as a bottoms product. The overhead from this first distillation zone is partially condensed and a portion of the vapor remaining after the partial condensation which is relatively rich in propylene, is compressed, superheated and then introduced into the lower portion of the first distillation zone wherein it achieves its three fold purposes of (1) reducing the temperature in the bottom of the first distillation zone, (2) retarding the trans-alkylation of aluminum tripropyl to aluminum trinonyl and (3) stripping of nonenes from the catalyst liquid.

The liquid product remaining after the partial condensation and any remaining vapor over and above that portion recycled to the first distillation zone are subsequently fractionated in a second distillation zone where propylene is removed as the overhead product, together with propane which is often employed in the dimerization reaction as an inert diluent. This propylene can be recycled to the dimerization reaction. The bottoms from this second distillation zone is the product hexenes and by-product nonenes.

To provide a basis for comparison of the merits of this invention, FIGURE 1 is presented as a less preferable embodiment wherein many of the advantages of this invention are obtained but at higher cost.

FIGURE 1

Referring to the accompanying drawing, in FIGURE 1, a dimerization reactor effluent including propylene, hexenes, nonenes and catalyst liquid is passed via line 11 into distillation column 10. An overhead fraction made up of propylene, hexenes and substantially all the nonenes is withdrawn overhead via line 12 and passed to condenser 13. The condensate is passed via line 13a to tank 14, and then through line 14a, pump 15, and line 16 to column 18. A part thereof is passed via line 17 back to column 10 as reflux. A bottoms fraction is withdrawn via line 35. It is the substantially nonene-free catalyst liquid and it may be recycled to the dimerization reactor.

A propylene fraction is removed from column 18 as an overhead product. It passes via line 19 to condenser 20 wherein it is partially liquefied and then via line 20a to tank 21. The liquefied part thereof is passed to column 18 as reflux via line 22, pump 23 and line 24. Propylene vapor is recycled to the reactor via line 25. Propylene stripping vapor is passed via line 26 to superheater 27 wherein the vapor is superheated and then via line 28 to the lower part of distillation column 10.

A hexene fraction containing higher polymers is removed via line 29. A part thereof is passed via line 30 to reboiler 31. The vaporized fraction is passed via line 32 to the lower section of column 18 as a source of heat.

The first distillation zone must be operated at a pressure not less than 200 p.s.i.a. in order to completely condense the overhead fraction with normal cooling water. If the first distillation zone is operated at pressures from 50 to 200 p.s.i.a. refrigeration is required to condense the overhead fraction.

The temperature in the first distillation zone should not exceed 500° F. When the first distillation zone is operated above about 600 p.s.i.a. the bottoms temperature will be about 500° F. and thus 600 p.s.i.a. represents the highest pressure at which the first distillation zone should be operated. The preferred pressure is 200 to 300 p.s.i.a.

The reflux ratio in the first distillation zone may be from 0.1 to 10 but it is desirable to use a reflux ratio of from 0.3 to 7 and preferable to use a ratio of from 0.7 to 3.0.

The quantity of propylene recycled to the lower portion of the first distillation zone is independent of the amount of dodecylenes and higher polymers accompanying the aluminum trialkyl catalyst. In general, the lower the first distillation zone pressure the less stripping vapor is required. The amount of propylene recycled should be from 2 to 150 mols per mol of aluminum trialkyl catalyst in the dimerization reactor effluent. It is desirable to recycle 5 to 75 mols of propylene per mol of aluminum trialkyl compound and preferable to recycle from 10 to 50 mols per mol.

The second distillation zone may be operated at a pressure of from 50 to 600 p.s.i.a. It is preferred, however, to operate at a pressure of from 200 to 300 p.s.i.a. In order to condense the overhead from the second distillation zone with cooling water it is necessary to operate at a presure of at least 200 p.s.i.a. The reflux ratio in the second distillation zone may be from 0.2 to 10 but it is preferable to use a reflux ratio of from 1.0 to 2.0.

The propylene recycle to the first distillation zone may be superheated as high as 500° F., the temperature above which catalyst deactivation occurs; it is preferred, however, to superheat the propylene to about 400° F.

It has now been discovered that although the process scheme set forth in FIGURE 1 is suitable for achieving the threefold purposes set forth, there are yet other process schemes which, though based on the same principle, achieve the same results with greater efficiency. The following illustrates a more efficient embodiment of the instant invention.

FIGURE 2

Figure 2:
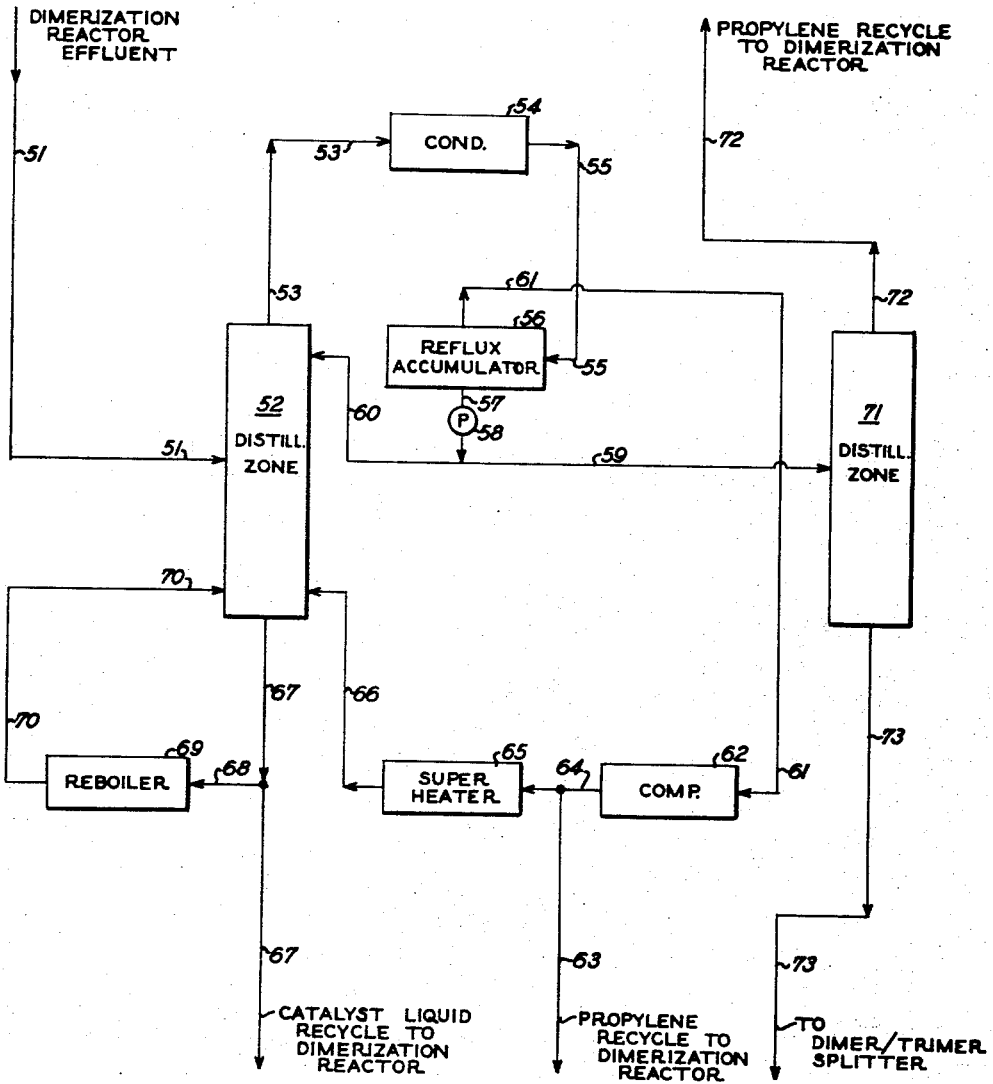

In FIGURE 2 of the accompanying drawing, a dimerization reactor effluent including propylene, hexene, nonenes and the catalyst liquid is passed via line 51 into distillation zone 52. An overhead fraction made up of propylene, hexene, and most of the nonenes is withdrawn overhead via line 53. The overhead is partially condensed in condenser 54 and is passed via line 55 to reflux accumulator 56. The liquid phase in the reflux accumulator is passed via line 57 to pump 58. The hexenes, nonenes and propylene are pumped via line 59 to distillation zone 71 wherein the propylene is removed overhead and recycled to the dimerization reactor via line 72. The propylene free hexenes and nonenes in the bottoms fraction are removed via line 73 and are further purified in a dimer/trimer splitter not shown. The first distillation zone 52 is refluxed via line 60.

The vapor phase in reflux accumulator 56 is passed via line 61 to compressor 62. The compressed propylene is divided into two streams. The first stream is recycled via line 63 to the dimerization reactor. A booster compressor, not shown, may be required and if the stream contains considerable hexenes it may be fed to distillation zone 71 for purification prior to recycle. The second stream is recycled via line 64 to superheater 65. After superheating, the propylene is passed via line 66 to the lower portion of distillation zone 52.

The catalyst liquid from which nonenes have been stripped is recycled via line 67 to the dimerization reactor. Optionally a portion thereof may be passed via line 68 to reboiler 69, and after vaporization is passed via line 70 to distillation zone 52.

The advantages of this process scheme over that set forth in FIGURE 1 are as follows. It is possible to operate distillation zone 52 at a lower pressure than the distillation zone 10 of FIGURE 1, since it is unnecessary to totally condense the overhead from this zone. By operating the first distillation zone at a lower pressure a more favorable vapor-liquid equilibrium is established in that zone. It is therefore possible to use less propylene stripping vapor than is required at higher pressures. Furthermore, when operating under a lower pressure, high temperatures which cause catalyst degradation are avoided.

Aside from the fact that condenser requirements and cooling water requirements are less for the first distillation zone overhead there is also a lesser heat requirement for the second distillation zone since that column is fed less propylene by this method. It is not necessary to recycle to the first distillation zone a pure propylene stream as is produced in the second distillation zone since the recycle stream is introduced to the first distillation zone at a point wherein hexenes, nonenes and catalyst liquid are concentrated. The impure propylene fraction from the reflux accumulator is adequate to perform the stripping operation. In this way further economies in second distillation zone operation are achieved.

In order to achieve the beneficial results of the process as illustrated in FIGURE 2, the first distillation zone can be operated at a pressure of from 15 to 600 p.s.i.a. Below a pressure of 50 p.s.i.a. refrigeration is required to condense sufficient overhead to reflux the column and provide a liquefied hexane stream for further purification. It is preferred to operate the first distillation zone at a pressure of from 25 to 100 p.s.i.a.

The temperature of the first distillation bottoms should not exceed 500° F. When operated at a pressure of from 25 to 100 p.s.i.a. the bottoms temperature of the first distillation zone is from 250 to 350° F.

The reflux ratio in the first distillation zone may be from 0.1 to 10; it is desirable, however, that the reflux ratio be from 0.3 to 7 and it is preferred that the reflux ratio be from 0.7 to 3.0. Reflux ratio as used herein means moles of liquid reflux per mol of net overhead product, both liquid and vapor.

The propylene recycle to the first distillation zone is independent of compounds other than aluminum trialkyls in the dimerization reactor effluent fed to the first distillation zone. The amount of propylene recycle to the lower portion of the first distillation zone may be from 1 to 60 mols per mol of aluminum trialkyl compound. It is desirable to recycle 3 to 30 mols per mol and prefered to recycle 5 to 20 mols per mol. The propylene recycle may be superheated to 500° F. It is preferred, however, to superheat the recycle stream to about 400° F.

The second distillation zone can be operated at a pressure of from 50 to 600 p.s.i.a. but it is preferred to operate at a pressure of from 200 to 300 p.s.i.a. The reflux ratio in the second distillation zone should be from 0.2 to 10 and it is preferred to use a reflux ratio of from 1.0 to 2.0.

The following example illustrates the particularly preferred mode of practicing this invention, it being recognized that this example is presented as illustrative and not as limiting the scope of this invention. It should also be recognized that each of the distillation columns referred to in the following example can be modified in their design, as for example by increasing reflux ratio and by decreasing the number of plates or otherwise in order to achieve the most economic design for a specific plant capacity at a specific location; in other words, the following example presents only a typical design. In the following example, all parts are by weight, unless otherwise stated.

EXAMPLE 1

A dimerization reactor effluent is prepared by continuously reacting propylene, diluted with propane, in the liquid phase in the presence of a trialkyl aluminum catalyst. By far the majority of the alkyl groups in the catalyst are propyl groups. Relatively small proportions of hexyl and nonyl groups are also present in the catalyst in the dimerization reactor effluent. Extremely small amounts of dodecyl groups are also present. In this manner approximately 48 parts/hr. of a dimerization reactor effluent having the composition shown in the first column of Table I are prepared.

temperature of 345° F. In this manner more than 98% of the tripropyl aluminum that would otherwise have been discarded in this purge stream is recovered and the amount of purge is reduced to only about 0.1 part/hr. The final purge has the composition given in the fourth column of Table I.

The catalyst stripper overhead contains over 97% of the hexenes in the feed and over 65% of the nonenes.

Catalyst stripper overhead is partially condensed by indirect heat exchange with water to produce a mixture of vapor and liquid. The temperature and pressure following the partial condensation are respectively 95° F. and 60 p.s.i.a. The liquid and vapor are then separated. Thereby about 57.2 parts/hr. of an overhead vapor and about 49.2 parts/hr. of an overhead liquid are obtained. Vapor composition is given in the fifth column of Table I and liquid composition is given in the sixth column of Table I.

Both the liquid and vapor streams are each divided into two parts; 25.4 parts/hr. of the liquid are returned

TABLE I

| Component | Stream Compositions for Example 1 (Mol Percent) | | | | | | | | | |
|---|---|---|---|---|---|---|---|---|---|---|
| | (1) | (2) | (3) | (4) | (5) | (6) | (7) | (8) | (9) | (10) |
| | Dimer Reactor Effluent | Stripper Overhead | Stripper Bottoms | Catalyst Bleed | Stripper Overhead Vapor | Stripper Overhead Liquid | $C_3$–$C_6$ Splitter Overhead | $C_3$–$C_6$ Splitter Bottoms | $C_6$–$C_9$ Splitter Overhead | $C_6$–$C_9$ Splitter Bottoms |
| Propylene | 19.8 | 42.8 | 1.4 | 0.9 | 57.7 | 14.6 | 60.0 | 0.2 | 0.2 | |
| Propane [1] | 13.1 | 26.4 | 1.0 | 0.6 | 34.7 | 10.8 | 40.0 | 0.1 | 0.1 | |
| Hexenes | 45.2 | 30.0 | 2.7 | 1.5 | 7.6 | 72.3 | <0.05 | 96.7 | 99.6 | 10.0 |
| Nonenes | 2.1 | 0.8 | 2.5 | 2.2 | | 2.3 | | 3.0 | 0.1 | 89.8 |
| Dodecene | 7.9 | | 36.0 | 3.0 | | | | | | |
| Heavy Hydrocarbons [2] | 0.4 | | 2.0 | 20.0 | | | | | | |
| Tripropyl Aluminum | 10.1 | | 42.7 | 6.7 | | <0.05 | | | | 0.2 |
| Trihexyl Aluminum | 0.7 | | 4.9 | 2.2 | | | | | | |
| Trinonyl Aluminum | 0.5 | | 4.8 | 38.5 | | | | | | |
| Tridodecyl Aluminum | 0.2 | | 2.0 | 24.4 | | | | | | |
| Total | 100.0 | 100.0 | 100.0 | 100.0 | 100.0 | 100.0 | 100.0 | 100.0 | 100.0 | 100.0 |

[1] Includes small amounts (<5% of the propane content) of other paraffin inerts, viz., ethane and butane.   [2] Assumed to be pentadecene.

A continuous fractionation system, similar to that shown in FIGURE 2, is set up to process the dimerization reactor effluent. The details of the apparatus comprising this fractionation system will be described in conjunction with the description of the fractionation operation below.

The dimerization reactor effluent is fed to a first distillation column, called hereinafter the "catalyst stripper," wherein substantially all hexenes and most of the nonenes are stripped from the dimerization reactor effluent by a superheated hydrocarbon vapor. The catalyst stripper is equipped with a plurality of a tray-type contacting devices equivalent to 10 theoretical contacting stages. The catalyst stripper overhead temperature and pressure are respectively 190° F. and 65 p.s.i.a. The bottoms temperature is 290° F. Reflux ratio (expressed as mols of liquid reflux returned to the column per mol of net overhead product, both liquid and vapor) is 0.83:1. Stripping vapor temperature is 320° F. and stripping vapor rate (expressed as mols of stripping vapor per mol of trialkyl aluminum in the feed) is about 18.8:1. Total column overhead is about 106.4 parts/hr. and its composition is given in the second column of Table I. Total columns bottoms is about 21.5 parts/hr. and its composition is given in the third column of Table I.

The bottoms, containing trialkyl aluminum catalyst, is divided into two parts; the first part, 19.8 parts/hr. is recycled to the dimerization reaction. The remainder, about 1.7 parts/hr., is the catalyst purge. If desired, the amount of catalyst purge can be drastically reduced by contacting the catalyst purge with the stripping vapor in a separate stripping zone before such stripping vapor is admitted to the catalyst stripper. In the system of this example, this stripping zone is a tower having 8 tray-type contacting devices. Substantially all the stripping vapor fed to the catalyst stripper first passes through this tower and then, from the overhead of this purge stripping tower, it passes to the catalyst stripper together with the material stripped from the purge stream. This purge stripper operates at a pressure of 70 p.s.i.a. with an inlet stripping gas to the catalyst stripper as reflux and 52.9 parts/hr. of the vapor are compressed to 75 p.s.i.a. and superheated to provide stripping vapor to the catalyst stripper.

The remaining overhead vapor (4.3 parts/hr.) is compressed to 250 p.s.i.a. and fed to a second distillation column hereinafter referred to as the "$C_3$–$C_6$ splitter." The remaining liquid overhead product (23.8 parts/hr.) is passed through a pump having a discharge pressure of 250 p.s.i.a and is also fed to the $C_3$–$C_6$ splitter.

The $C_3$–$C_6$ splitter is a conventional distillation column equipped with a plurality of tray-type contacting devices equivalent of 10 theoretical plates. It is operated with an overhead temperature and pressure of 117° F. and 247 p.s.i.a. respectively and a bottoms temperature and pressure of 385° F. and 250 p.s.i.a. Reflux ratio (moles of reflux per mol of net overhead product) for this column is about 1.4:1. The net overhead product, amounting to 7.2 parts/hr. is totally condensed and recycled to the dimerization reaction. The balance of this column's total overhead (about 10 parts/hr.) is returned to the $C_3$–$C_6$ splitter as reflux. Overhead composition is given in the seventh column of Table I. The bottoms product from this distillation (20.9 parts/hr.) contains the net hexenes and nonenes product of the dimerization and has the composition given in the eighth column of Table I.

For many purposes the bottoms from the $C_3$–$C_6$ splitter may be useful as such; however, where desired, this material may be further processed to recover a substantially nonenes-free hexenes product. In this example the hexenes are separated from the nonenes. For this purpose a distillation column, hereinafter referred to as a "$C_6$–$C_9$ splitter" is provided. This column also has a plurality of tray-type contacting devices equivalent to five theoretical contacting stages. The feed to this column is the bottoms from the $C_3$–$C_6$ splitter, which passes through a pressure reducing valve having a down-stream pressure of approximately 27 p.s.i.a. and which thereby becomes partially vaporized, resulting in a feed having a molar vapor to liquid ratio of 62:1. The $C_6$–$C_9$ splitter operates with an overhead pressure and temperature of 180° F. and 26 p.s.i.a. and a bottoms temperature and pressure of 317° F. and 28 p.s.i.a. The net overhead product from this column is not condensed, only sufficient of the overhead is condensed to adequately reflux the column. The column operates with a reflux ratio (mols of liquid reflux per mol of overhead vapor product of 0.295:1). The overhead product of $C_6$–$C_9$ splitter is 20.0 parts/hr. and has the composition given in the ninth column of Table I. The bottoms of the $C_6$–$C_9$ splitter is about 0.9 part/hr. and has the composition given in the tenth column of Table I.

The dimerization reaction is continuously conducted over a period in excess of 1,000 hours in conjunction with the fractionation system hereinabove described. During this period it is found that dimerization catalyst activity remained substantially constant. It is also found that the hexenes product are eminently suited for cracking to isoprene in high yield.

It will thus be apparent that the fractionation system of this invention permits sustained operation of the dimerization reaction without noticeable degradation of the catalyst and with high recoveries of high purity product hexenes.

In general, the trialkyl aluminum utilized in the selective dimerization step can be any trialkyl aluminum. However, desirably the alkyl aluminum added to the reaction mixture is a tri-(lower-alkyl) aluminum such as for example, aluminum triisobutyl or aluminum tripropyl. Apparently, in contact with propylene, these aluminum trialkyls are converted to a mixture of aluminum tripropyl and aluminum 2-methylpentyl. Suitable propylene dimerization reaction conditions are 250° and 1800 p.s.i.g.

Practice of the present invention is extremely advantageous in that there is produced a catalyst fraction which is substantially free of nonenes and which can be readily reused in the propylene dimerization. Additionally, maximized yields of the propylene dimer are achieved in convenient operation.

In view of the foregoing disclosures, other variations of this process scheme will be apparent to those skilled in the art. It is intended to include within the invention all such variations and modifications except as do not come within the scope of the appended claims.

What is claimed is:

1. A method for treating the effluent from a liquid phase propylene dimerization reaction which effluent contains unconverted propylene, hexenes, nonenes and catalyst liquid, said catalyst liquid containing aluminum trialkyl catalyst, which method comprises the steps of: (1) fractionating the effluent in a distillation zone at a pressure of from 15 to 600 p.s.i.a. to remove as an overhead fraction, propylene, hexenes, and most of the nonenes, and as a bottoms fraction substantially nonene-free catalyst liquid; (2) partially condensing the overhead from the distillation zone; (3) returning a portion of the liquid obtained by partial condensation to the distillation zone to provide reflux, the reflux ratio of said distillation zone being from 0.1 to 10, said reflux ratio being defined as moles of liquid reflux per mole of net overhead product, both liquid and vapor; (4) compressing a portion of the vapor phase from the partial condensation, which vapor contains propylene, super-heating and recycling the compressed vapor to the lower section of the distillation zone where it acts as a stripping vapor for the catalyst liquid, said vapor being from 1 to 60 times the molar amount of aluminum trialkyl catalyst in said catalyst liquid, which method permits the recovery of aluminum trialkyl catalyst in high activity form.

2. A process as recited in claim 1 wherein the amount of vapor recycled to the lower section of the distillation zone is from 3 to 30 moles per mole of aluminum trialkyl catalyst in said catalyst liquid.

3. A process as recited in claim 2 wherein the distillation zone is operated at a pressure of 25 to 100 p.s.i.a. and the propylene recycle stream is superheated to not more than 500° F.

References Cited

UNITED STATES PATENTS

| | | | |
|---|---|---|---|
| 2,327,643 | 8/1943 | Houghland | 203—26 |
| 2,371,860 | 3/1945 | Walls et al. | 203—49 |
| 2,452,797 | 11/1948 | Smith | 203—70 |
| 2,619,814 | 12/1952 | Kniel | 203—26 |
| 2,906,794 | 9/1959 | Aldridge et al. | 260—683.15 |
| 3,096,380 | 7/1963 | Bolenl | 203—70 |
| 3,171,865 | 3/1965 | Davison et al. | 203—70 |
| 3,218,343 | 11/1965 | Acciarri et al. | 203—70 |
| 3,309,288 | 3/1967 | Butterbough | 203—70 |

WILBUR L. BASCOMB, Jr., *Primary Examiner.*

U.S. Cl. X.R.

203—26, 70, 75, 77, 87, 93, 100; 260—677, 683.15, 448